(12) United States Patent
Wolf et al.

(10) Patent No.: US 6,711,524 B2
(45) Date of Patent: Mar. 23, 2004

(54) METHOD AND APPARATUS FOR MONITORING SERVICE-INTENSIVE REPLACEABLE PARTS IN AN ASSEMBLY

(75) Inventors: Michael Wolf, Neunkirchen (DE); Christian Thalmann, Speyer (DE); Volker Pluecker, Ubstadt-Weiher (DE); Torsten Oberdorfer, Schifferstadt (DE); Klemens Dworatzek, Edingen-Mhu. (DE); Horst Escher, Asperg (DE); Andreas Franz, Kornwestheim (DE); Andreas Pelz, Markgroeningen (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 10/191,757

(22) Filed: Jul. 10, 2002

(65) Prior Publication Data

US 2003/0025598 A1 Feb. 6, 2003

Related U.S. Application Data

(63) Continuation of application No. PCT/EP01/00233, filed on Jan. 10, 2001.

(30) Foreign Application Priority Data

Jan. 10, 2000 (DE) ........................................ 100 00 435

(51) Int. Cl.⁷ ................................................ G06F 11/07
(52) U.S. Cl. ...................................... 702/182; 224/512
(58) Field of Search .......................... 73/491, 493, 502; 324/503, 512, 513, 537, 759, 764; 700/108, 110, 174, 175, 177, 281, 282; 701/2, 29, 30, 33, 34, 35; 702/33, 34, 35, 36, 45, 47, 57, 58, 59, 130, 182, 183, 184, 185, 189; 714/25, 30, 47, 48

(56) References Cited

U.S. PATENT DOCUMENTS

| 5,758,300 | A | * | 5/1998 | Abe ........................... 455/456 |
| 5,884,202 | A | * | 3/1999 | Arjomand ..................... 701/29 |
| 5,977,870 | A | * | 11/1999 | Rensel et al. ................ 340/447 |
| 6,014,080 | A | * | 1/2000 | Layson, Jr. .............. 340/573.1 |
| 6,128,448 | A | * | 10/2000 | Arcaro et al. .................. 399/27 |
| 6,195,602 | B1 | * | 2/2001 | Hazama et al. ............... 701/48 |
| 6,285,931 | B1 | * | 9/2001 | Hattori et al. ................ 701/29 |
| 6,325,540 | B1 | * | 12/2001 | Lounsberry et al. ........ 378/207 |
| 6,356,823 | B1 | * | 3/2002 | Iannotti et al. ............... 701/35 |
| 6,415,207 | B1 | * | 7/2002 | Jones ............................ 701/1 |

(List continued on next page.)

FOREIGN PATENT DOCUMENTS

| DE | 4402836 | 8/1995 |
| DE | 19601651 | 7/1997 |
| DE | 19647595 | 5/1998 |
| DE | 19812480 | 9/1999 |
| DE | 19822751 | 9/1999 |
| EP | 0875006 | 12/1996 |
| WO | 97/26563 | 7/1997 |
| WO | 00/32298 | 6/2000 |

*Primary Examiner*—Marc S. Hoff
*Assistant Examiner*—Edward Raymond
(74) *Attorney, Agent, or Firm*—Crowell & Moring LLP

(57) ABSTRACT

A method and apparatus for monitoring service-intensive replaceable parts in an assembly in which information regarding a replaceable part (1), such as specifications, physical dimensions, physical properties, functions and/or other data for the replaceable part, is stored on a suitable memory component (5) in and/or on the replaceable part (1). The stored data is read with a reading device at a predetermined time or at predetermined time intervals and transmitted to an evaluation unit. The read data can be compared in the evaluation unit with preset data and, after evaluating the results of the comparison of the data, an appropriate change in the replaceable part or in the operation of the assembly may or may not be carried out.

25 Claims, 2 Drawing Sheets

U.S. PATENT DOCUMENTS 6,416,471 B1 * 7/2002 Kumar et al. ................ 600/300
6,454,708 B1 * 9/2002 Ferguson et al. ............ 600/300
6,494,829 B1 * 12/2002 New et al. ................... 600/300
6,496,705 B1 * 12/2002 Ng et al. ..................... 455/502
6,512,968 B1 * 1/2003 de Bellefeuille et al. ..... 701/33

* cited by examiner

METHOD AND APPARATUS FOR MONITORING SERVICE-INTENSIVE REPLACEABLE PARTS IN AN ASSEMBLY

CROSS REFERENCE TO RELATED APPLICATIONS

This application is a continuation of international patent application no. PCT/EP01/00233, filed Jan. 10, 2001, designating the United States of America, the entire disclosure of which is incorporated herein by reference. Priority is claimed based on Federal Republic of Germany patent application no. DE 100 00 435.0, filed Jan. 10, 2000.

BACKGROUND OF THE INVENTION

The invention relates to a method and apparatus for monitoring service-intensive replaceable parts in an assembly, particularly for monitoring a filter element.

Monitoring of service-intensive replaceable parts is necessary in many applications. For instance, in various machinery and equipment and particularly in a motor vehicle, filters and similar elements are used in a wide variety of applications to filter air and liquids or also e.g. to remove oil from air. The filter arrangements are typically provided with filter elements that in turn have a defined service life and must be replaced regularly during service and maintenance work.

It is known, for example, from published German patent application no. DE 44 02 836 A1 that at least the correct use of suitable replacement parts is ensured by the fact that the corresponding add-on component can be attached to the unit only in accordance with the lock and key principle. But the problem remains that a nevertheless possible improper use of replacement parts can shorten the service life or decrease the functioning of the unit. Improper use, or the consequences thereof are then very hard or impossible to detect and it can be difficult to avoid system failures.

Published German patent application no. DE 198 22 751 discloses a system and method for identifying accessory and auxiliary materials and supplies for technical equipment. For this purpose, the auxiliary materials or supplies are provided with a data carrier section, which stores information that is visible to the human eye and can be distinguished by a human observer. The technical equipment is provided with a reading and evaluation unit for this information.

Furthermore, published German patent application no. DE 198 12 480 discloses an inkjet printer in which the supply bottle is provided with a label comprising coded information regarding the liquid contained therein, e.g. expiration date, type of liquid, etc.

Active information processing is, however, not disclosed in the prior art.

SUMMARY OF THE INVENTION

It is the object of the invention to provide a method and apparatus for monitoring service-intensive replaceable parts in an assembly.

Another object of the invention is to provide a method and apparatus for monitoring service-intensive replaceable parts which makes it possible to check proper functioning of the monitored parts in a simple manner.

These and other objects are achieved in accordance with the present invention by providing a method of monitoring service-intensive replaceable parts in an assembly, wherein information regarding a replaceable part is stored in a memory component in or on the replaceable part, said method comprising reading the stored information with a reader device capable of extracting stored information from the memory unit, transmitting the read information to an evaluation unit, and evaluating the information in the evaluation unit.

In accordance with a further aspect of the invention, the objects are achieved by providing an apparatus for monitoring a service-intensive replaceable part in an assembly, said apparatus comprising a memory component attached to the replaceable part for storing information relating to the replaceable part.

According to the invention the service-intensive replaceable parts in an assembly are monitored by storing a number of specific data, the geometric dimensions, the physical properties and/or the functions or other specifying data of the replaceable part in and/or on the replaceable part in a suitable memory component.

With suitable reading devices the data can then be simply read at predetermined times or predetermined time intervals into an evaluation unit. Particularly advantageously, the read data can then be compared in the evaluation unit with predefined data and after evaluating the comparison of the data, a change in the functions of the replaceable part and/or the assembly can be carried out. As an alternative thereto, the read data is also compared with predefined data in the evaluation unit and after evaluating the comparison of the data the result can be stored.

The inventive interplay of storing, reading, evaluating and possibly controlling data advantageously makes it possible e.g. that if proper use of a suitable replaceable part is detected an assembly can be started up or, conversely, if proper use is not detected, the unit can be blocked. In addition, or instead, an "error flag" may be forward to a higher-level control unit, so that the improper use of a replaceable part is at least registered.

In one particularly advantageous embodiment of the invention, the service-intensive replaceable parts are filter elements, e.g. in an internal combustion engine of a motor vehicle, which are removed and replaced after a predetermined period or when their function is impaired.

According to the invention, a particularly advantageous device for performing the described method provides that an electronic semiconductor component with a suitable memory element for the data be attached to the replaceable part. The semiconductor component may take the form of an electronic chip which can be integrated in the filter element, for instance near a wall, in which case an evaluation and/or control unit can be mounted in proximity thereto. However, the chip can also be integrated e.g. in the mounting flange or in the adhesive chamber of the filter element.

As an alternative to attaching a chip, the replaceable part may also be simply provided with a memory component comprising a barcode field, a hologram, or a magnetic strip as the memory element for the data.

Advantageously, the reader or the memory component can also be provided with a transmission unit by means of which the data detected or read on the replaceable part can be transmitted to a control unit, preferably in a contactless manner, i.e., without a direct connection.

Such a transmission unit can, for instance, be a transponder, e.g. a chip as a memory component with integrated antenna unit, which is capable of transmitting data across a distance of several meters. Such systems are thus based on contactless power and data transmission. This is also a simple way to transmit multiple items of data related to the function of the replaceable part and/or the assembly of which it is a part. For instance, sensors for detecting pressure, temperature, moisture, residual oil content, etc. can also be integrated in a chip in or on the replaceable part.

Typical transponders normally comprise a coil and an oscillating circuit, with one or more sensors of the described type being arranged on the oscillating circuit. The transponders can be either active identification systems or passive data carriers, i.e. not comprising a battery. For the transmission of the data to a base station, the base station generates a certain oscillation frequency and the transponder detunes this frequency. This change is connected with the measured signal of the respective sensor that is arranged on the transponder. Transmission from the transponder to the base station in a passive system can be effected across a distance of up to 100 cm, and in active or semi-active systems across substantially larger distances.

According to one embodiment of the invention, the data can be encoded between the transponder and the base station. The coding scheme is variable. One base station can evaluate a plurality of transponders. This provides a significant advantage particularly if a plurality of service-intensive replaceable parts must be monitored. Evaluation is carried out, for instance, in multiplex mode.

When measuring a pressure differential, it is advantageous according to one embodiment of the invention to arrange a single transponder at the interface between the two pressures. Especially if replaceable parts or components are monitored in a vehicle, it is advisable to use a single base station that is arranged near the transponders to evaluate the transponders. The data detected by the individual sensors should not only be available in the vehicle but also at a central control station of the vehicle. Here, a further embodiment of the invention provides that this data is transmitted via a satellite navigation system or a mobile radio communication system to the central control station and that information is returned to the vehicle or the driver by the central control station.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to the structure and operation of illustrative preferred embodiments of a device for monitoring service-intensive replaceable parts in an assembly shown in the accompanying drawing figures, in which.

DETAILED DESCRIPTION OF PREFERRED EMBODIMENTS

Figure 1:
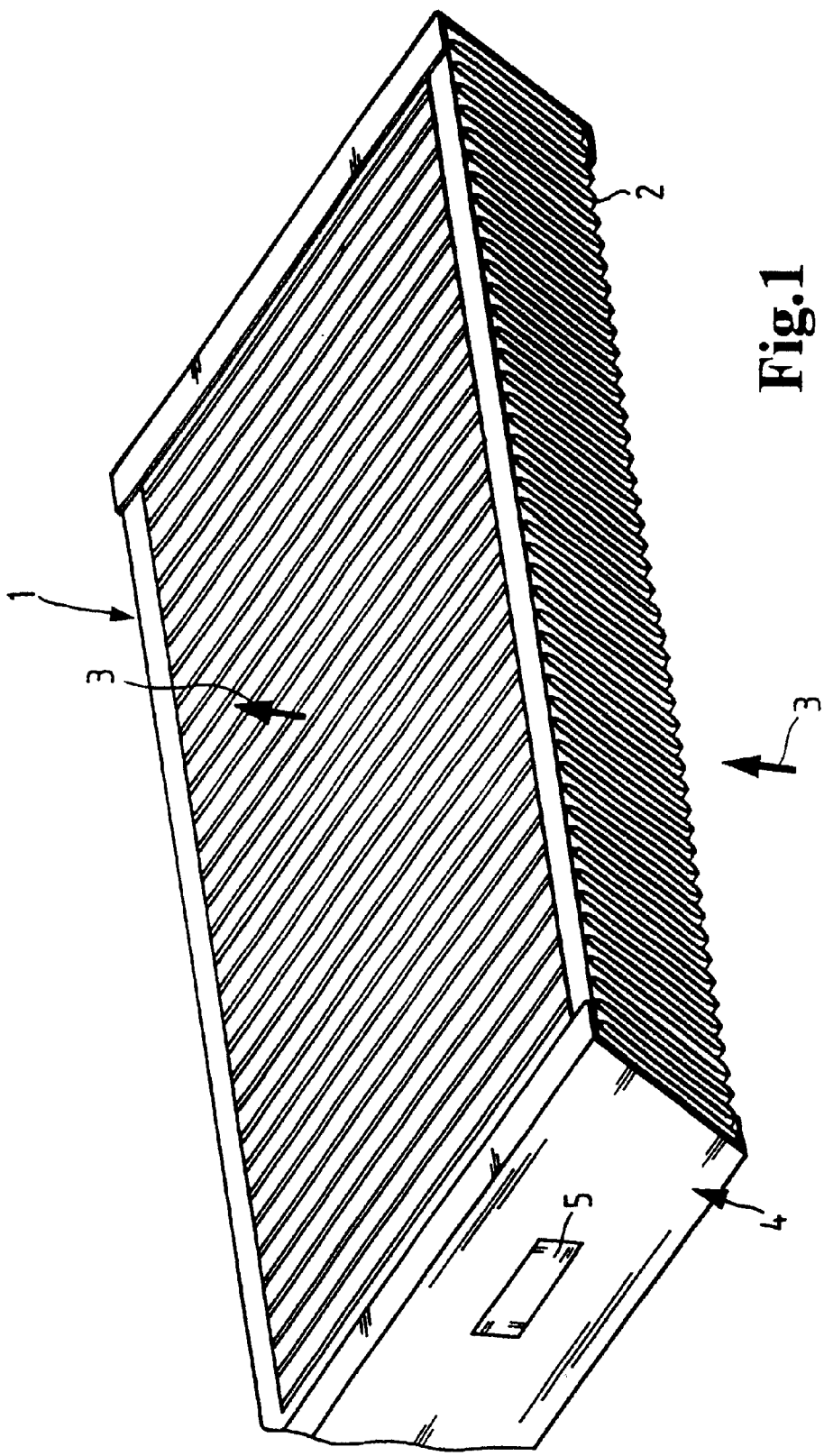
FIG. 1 is a perspective view of a filter element with a memory component.

FIG. 1 schematically depicts an air filter element 1 as a replaceable part, which comprises filter layers 2 for filtering the intake air as indicated by arrows 3 and which can be mounted in an internal combustion engine. A memory component 5 is attached to a plastic wall 4 of filter element 1.

The memory component 5 can be an electronic semiconductor component or chip, also an active component, which comprises suitable memory elements for the data. This electronic chip is integrated into filter element 1 on plastic wall 4 such that a reading, evaluation and/or control unit (not shown) can be mounted in its vicinity. The memory component 5 may also comprise a barcode field, a hologram, or a magnetic strip as the memory element.

In addition, in a further development of the exemplary embodiment shown, the chip as memory component 5 can be configured in such a way that the reader is provided with a transmission unit by which the data read on filter element 1 can be transmitted to the control unit, preferably in a contactless manner.

Figure 2:
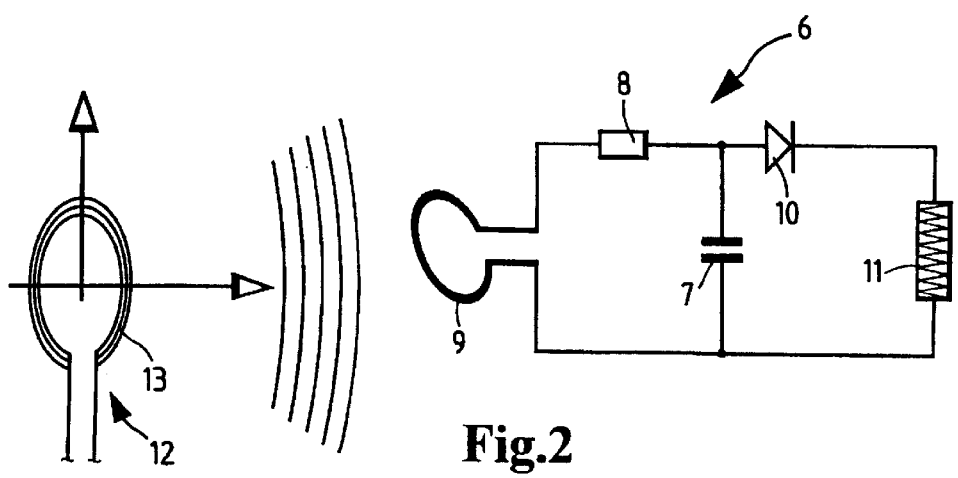
FIG. 2 is a schematic illustration of the configuration of a transponder.

FIG. 2 schematically illustrates the configuration of power transmission in passive transponder systems. Transponder 6 comprises an oscillating circuit with a capacitor 7, an ohmic resistor 8, and a coil 9. A sensor, e.g. a strain gauge 11, is connected via a rectifier diode 10. The transponder is a passive component. The base station activates the transponder. This base station 12 has an antenna 13. The electromagnetic field of antenna 13 is influenced by the oscillating circuit of transponder 6. Antenna 13 detects this influence and forwards it as a signal to the base station. The frequency displacement that is generated by the oscillating circuit of the transponder is converted into an electrical signal, which reflects the change in strain gauge 11. Various sensors, including, for instance, temperature sensors, moisture sensors, differential pressure sensors, etc. may be arranged on the transponder 6. The transmission principle remains the same. It is of course also possible to use active transponders, i.e. transponders provided with battery systems.

Figure 3:
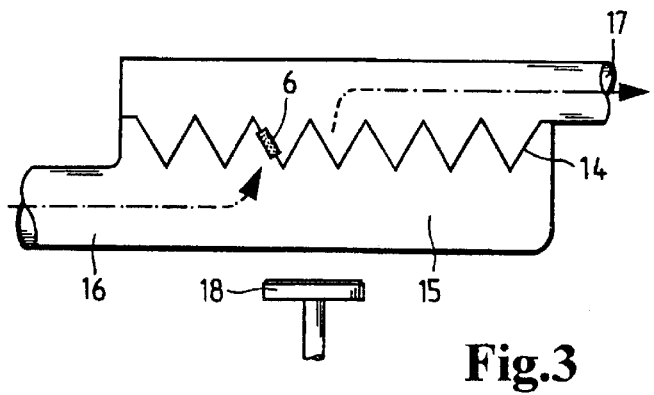
FIG. 3 is a detail view of a transponder.

FIG. 3 shows a transponder 6 for determining the differential pressure. For this purpose, the transponder is arranged on a pleated filter element 14. The filter element is made, for instance, of a nonwoven material or a filter paper and is arranged inside a filter housing 15. The filter element is used to filter the intake air of an internal combustion engine. The intake air flows through an unfiltered air intake 16 into filter housing 15, is cleaned by filter element 14, and leaves the filter system through the filtered air outlet 17. To determine the degree of contamination of the filter element, a differential pressure measurement is typically used. For differential pressure measurement, transponder 6 is arranged directly on the filter element, i.e., the respective pressures prevailing on both sides of the filter element act on corresponding sides of the transponder 6. The transponder thus measures the pressure difference by means of e.g. a strain gauge. The measurement signal is transmitted to base station 18, which is depicted schematically.

Figure 4:
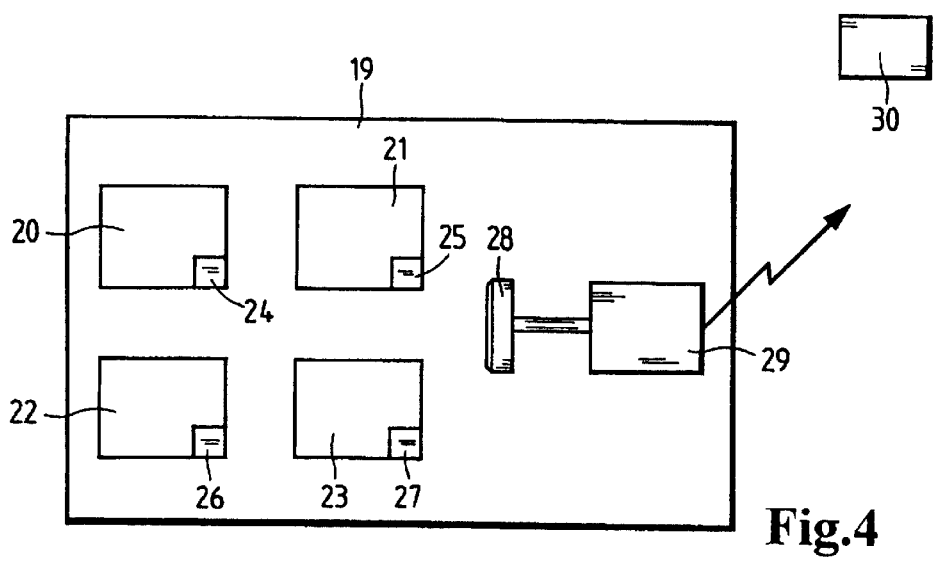
FIG. 4 is a schematic view illustrating a plurality of transponders in a motor vehicle.

FIG. 4 is a schematic view of a plurality of transponders arranged in a vehicle. Certain measured values are monitored in a vehicle. These are typically the temperature of the motor oil, the oil content in aerosols, the differential pressure of a filter element, or the condition of a valve. Corresponding transponders can of course monitor a number of additional values or states. In this schematically depicted vehicle 19, four components 20, 21, 22, 23 are equipped with transponders 24, 25, 26, 27. The base station or antenna 28 receives the signals of transponders 24–27 and transmits these signals to a central processing unit (CPU) 29. From this CPU, via a corresponding transmission device and a corresponding transmission system, e.g. a satellite navigation unit, the signals reach a central station 30 where they are evaluated and correspondingly further processed or transmitted to the driver of the vehicle.

If replaceable parts are provided with the described transponders it is furthermore possible to test these parts at the time of distribution and to check an order for correct assembly. The advantage of a data carrier or a memory element arranged in a component is that all the data of the component can be stored on this data carrier. An additional datasheet is thus unnecessary. The characteristics of the component can be read and displayed by a corresponding reader, which can for example also be configured as a hand-held reader.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A method of monitoring service-intensive replaceable parts in an assembly, wherein information regarding a replaceable part is stored in a memory component in or on the replaceable part, said method comprising reading the stored information with a reader device capable of extracting stored information from the memory component, transmitting the read information to an evaluation unit, and evaluating the read information in the evaluation unit, wherein said stored information is selected from the group consisting of application data, geometric configuration, physical dimensions, physical properties, composition, and functional properties.

2. A method according to claim 1, wherein the stored information in the memory component is read at predetermined time intervals.

3. A method according to claim 1, wherein the read information is compared in the evaluation unit with data values stored in the evaluation unit, and a result of the comparison is used to control subsequent operation or maintenance of the replaceable part.

4. A method according to claim 1, wherein the read information is compared in the evaluation unit with data stored in the evaluation unit, and a result of the comparison is stored.

5. A method of monitoring service-intensive replaceable parts in an assembly, wherein information regarding a replaceable part is stored in a memory component in or on the replaceable part, said method comprising reading the stored information with a reader device capable of extracting stored information from the memory component, transmitting the read information to an evaluation unit, and evaluating the read information in the evaluation unit, wherein the replaceable part is a filter element, and the evaluation of the read information is used to determine whether the filter element needs to be replaced.

6. A method according to claim 1, wherein said assembly is a part of a motor vehicle.

7. A method according to claim 1, wherein said memory component comprises an inductive identification system which transmits information to a base station.

8. A method according to claim 7, wherein said memory component is an active system which operates under battery power.

9. A method according to claim 7, wherein said memory component is a passive system.

10. A method according to claim 1, wherein said memory component comprises a transponder, which determines at least one measured value regarding the replaceable part and transmits the measured value to at least one base station.

11. A method according to claim 10, wherein said at least one measured value is selected from the group consisting of temperature, moisture, pressure, shock, acceleration, light, flow rate, pH value, gases, and conductance.

12. A method according to claim 1, wherein transmission of the stored information from the memory component to the reader device is encoded, and transmission and receiving signals are tuned via certain codes.

13. An apparatus for monitoring a service-intensive replaceable part in an assembly, said apparatus comprising a memory component attached to the replaceable part for storing information relating to the replaceable part, wherein said memory component comprises a barcode field encoding the information relating to the replaceable part, or a magnetic strip memory element encoded with the information relating to said replaceable part, or a hologram encoding the information relating to said replaceable part.

14. An apparatus according to claim 13, wherein said memory component comprises a barcode field encoding the information relating to said replaceable part.

15. An apparatus according to claim 13, wherein said memory component comprises a magnetic strip memory element encoded with the information relating to said replaceable part.

16. An apparatus according to claim 13, wherein said memory component comprises a hologram encoding the information relating to said replaceable part.

17. An apparatus according to claim 13, further comprising a reader device configured to read the information relating to said replaceable part, wherein at least one of the reader device and the memory component is provided with a transmission unit for transmitting the information detected or read on the replaceable part to a control unit.

18. An apparatus according to claim 17, wherein said transmission unit transmits said information to the control unit without direct connection to the control unit.

19. An apparatus according to claim 13, wherein the replaceable part is provided with at least one transponder, which operates passively or actively, detecting signals of a base station.

20. An apparatus according to claim 19, wherein a plurality of transponders is provided on one or more replaceable parts, and signals from the transponders are detected by at least one base station.

21. An apparatus for monitoring a service-intensive replaceable part in an assembly, said apparatus comprising a memory component attached to the replaceable part for storing information relating to the replaceable part, wherein at least one transponder is provided in a filter element for filtering liquids or gases, wherein the transponder is arranged between an unfiltered side and a filtered side of the filter element, and wherein the transponder serves to measure a pressure differential across the filter element.

22. An apparatus according to claim 13, wherein service-intensive replaceable parts of a motor vehicle have one or more transponders, and the information from the transponders is detected via at least one base station and transmitted from the base station to a central control unit.

23. An apparatus for monitoring a service-intensive replaceable part in an assembly, said apparatus comprising a memory component attached to the replaceable part for storing information relating to the replaceable part, wherein service-intensive replaceable parts of a motor vehicle have one or more transponders, and the information from the transponders is detected via at least one base station and transmitted from the base station to a central control unit, and wherein in order for the transponder to transmit the information through a metallic housing, a non-metallic opening is provided or a transmission transponder is arranged on the metallic housing.

24. An apparatus according to claim 22, wherein the information received by the base station is transmitted via data telecommunication to a central station where vehicle condition or the service-intensive replaceable parts are monitored.

25. An apparatus according to claim 24, wherein said telecommunication device comprises a global positioning unit or a mobile radio communication unit.

* * * * *